United States Patent [19]

Ziegelheim et al.

[11] Patent Number: 4,536,044
[45] Date of Patent: Aug. 20, 1985

[54] WORK STATIONS OF KNOCK-DOWN MODULAR COMPONENTS

[75] Inventors: Irwin I. Ziegelheim, Emerson, N.J.; Lawrence Lerner, New York, N.Y.

[73] Assignee: Discovery Concepts, Inc., Carlstadt, N.J.

[21] Appl. No.: 223,971

[22] Filed: Jan. 12, 1981

Related U.S. Application Data

[63] Continuation of Ser. No. 49,721, Jun. 18, 1979, , which is a continuation of Ser. No. 885,351, Mar. 13, 1978.

[51] Int. Cl.³ .................... A47B 43/00; A47B 27/00; F16B 12/00
[52] U.S. Cl. ................. 312/257 R; 312/111; 312/196; 312/263; 403/296
[58] Field of Search ............. 312/107, 108, 111, 194, 312/195, 196, 140, 263, 357 R; 108/131; 403/295, 296, 298, 292; 211/126

[56] References Cited

U.S. PATENT DOCUMENTS

| | | | |
|---|---|---|---|
| 926,374 | 6/1909 | Wright | 312/140 |
| 1,433,250 | 10/1922 | Vaughan | 312/196 |
| 2,499,146 | 2/1950 | Kindt | 403/296 |
| 2,930,665 | 3/1960 | Budai | 312/111 |
| 3,000,680 | 9/1961 | Belenko | 312/111 |
| 3,079,207 | 2/1963 | Deaton | 312/195 |
| 3,207,097 | 9/1965 | Schreyer | 312/194 |
| 3,232,613 | 2/1966 | Laube, Jr. | 403/296 |
| 3,389,666 | 6/1968 | Schultz-Bonatz | 312/257 R |
| 3,527,486 | 9/1970 | Gamp | 403/298 |
| 3,606,506 | 9/1971 | Ungaro | 312/111 |
| 3,644,008 | 2/1972 | Overby | 312/107 |
| 3,838,902 | 10/1974 | Tenani | 108/131 |
| 3,857,622 | 12/1974 | Mohr et al. | 312/257 R |
| 3,869,992 | 3/1975 | Kramer | 312/257 R |
| 3,870,390 | 3/1975 | Herrmann | 312/263 |
| 3,883,258 | 5/1975 | Hewson | 403/298 |
| 3,884,002 | 5/1975 | Logie | 312/263 |
| 3,920,298 | 11/1975 | Lopez | 312/195 |
| 3,951,558 | 4/1976 | Komarov | 312/263 |
| 3,966,339 | 6/1976 | Nemecek et al. | 403/292 |
| 4,163,592 | 8/1979 | Nelson | 312/111 |

FOREIGN PATENT DOCUMENTS

| | | | |
|---|---|---|---|
| 347318 | 8/1960 | Switzerland | 312/195 |
| 787825 | 12/1957 | United Kingdom | 312/111 |

*Primary Examiner*—Victor N. Sakran
*Attorney, Agent, or Firm*—Stephen E. Feldman

[57] ABSTRACT

A pair of identical side panels are arranged in spaced relationship with a cross panel to form the vertical support for a work surface which is disposed on top of the cross panel and between the side panels to provide a basic work station in the form of a desk. These components: are pre-finished; can be stored and shipped knock-down (k-d); and are secured directly to each other with simple tools to provide the completed and assembled work station. Additional full or half-size side panels can be added to the basic desk to form vertical supports for additional work surfaces, to provide other work stations such as a desk and secretarial run-off combined, and/or a desk, run-off, and return combined. Individual drawers and/or open, shelved, door or drawer cabinets can thereafter be secured beneath the work surfaces and between the side panels of the return, run-off, and/or desk to provide the desired form of storage space, which can include, conventional type desk pedestals. Such drawers or cabinets are securable beneath the work surface and between the side panels for access from either the rear of the desk (the side where the user usually sits and works from), or the front of the desk (the side opposite the side where the user usually sits and works). The side panels, work surfaces, cabinets, and drawers are also secured together into a top unit which is set upon a desk, run-off, or return to provide yet other configurations of work stations.

5 Claims, 29 Drawing Figures

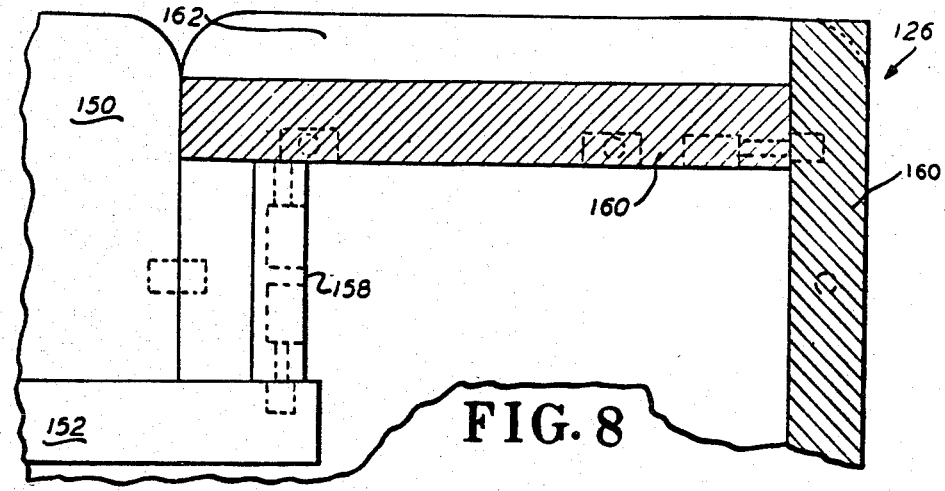
FIG. 8
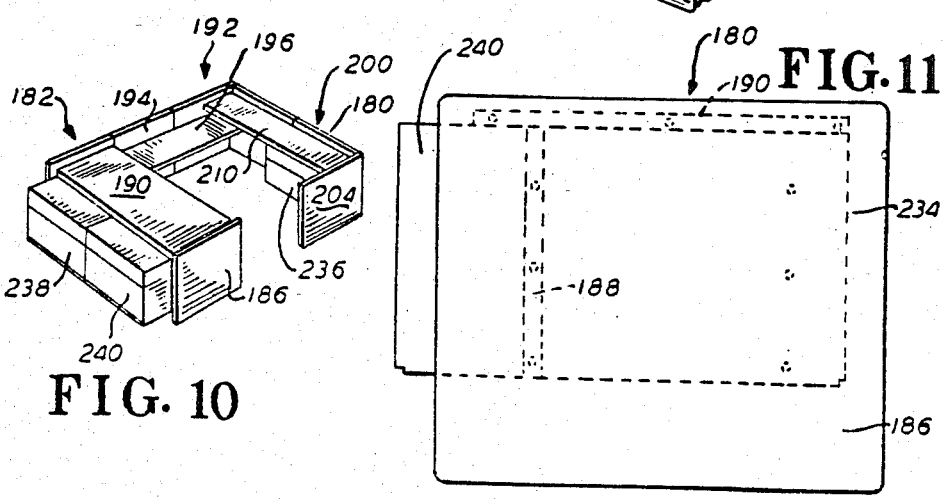
FIG. 9
FIG. 10
FIG. 11

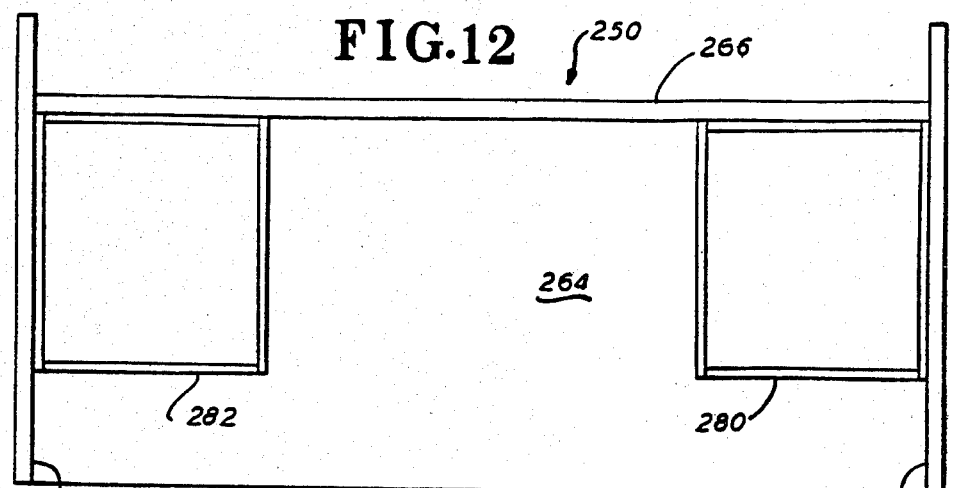
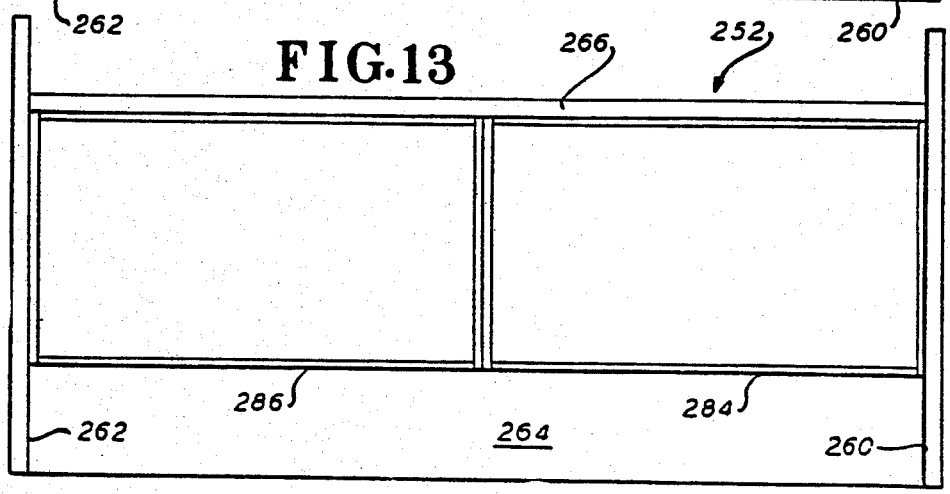
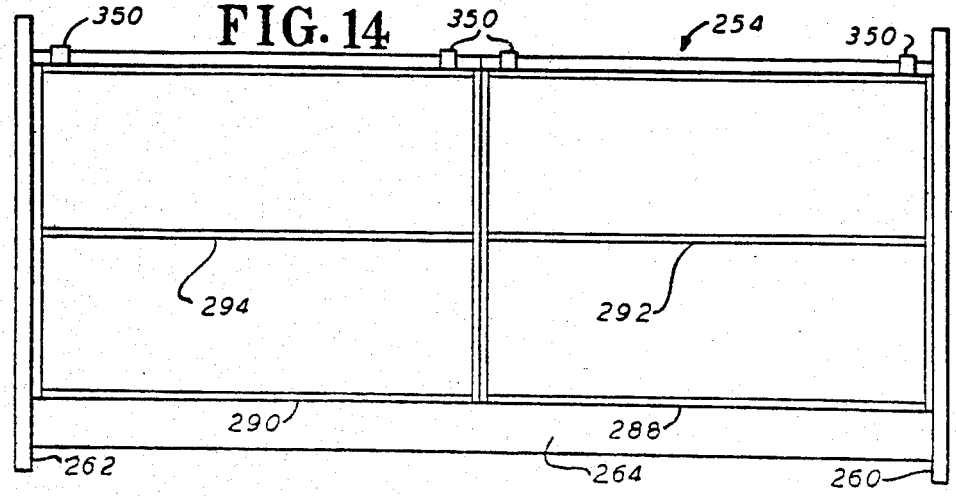

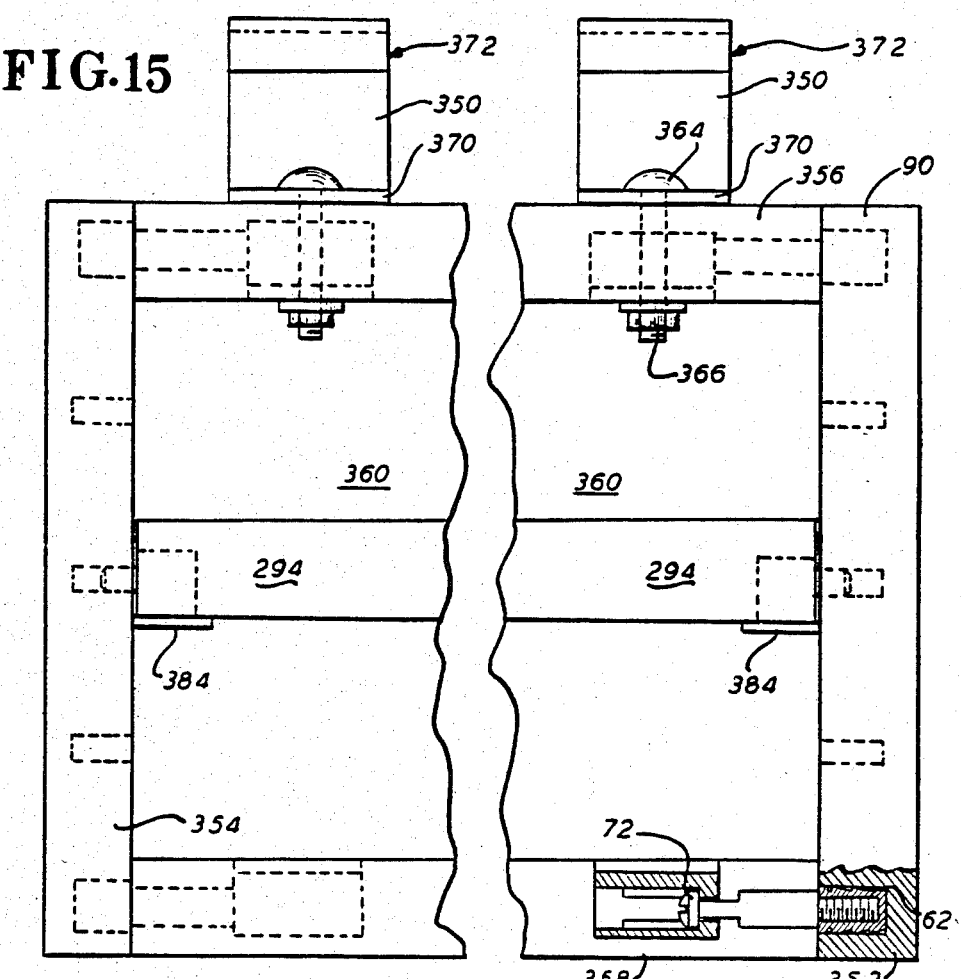
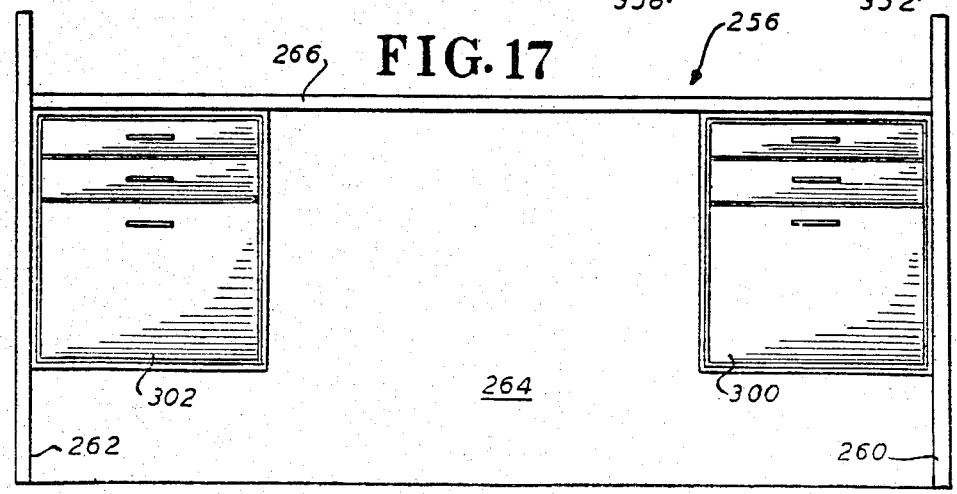

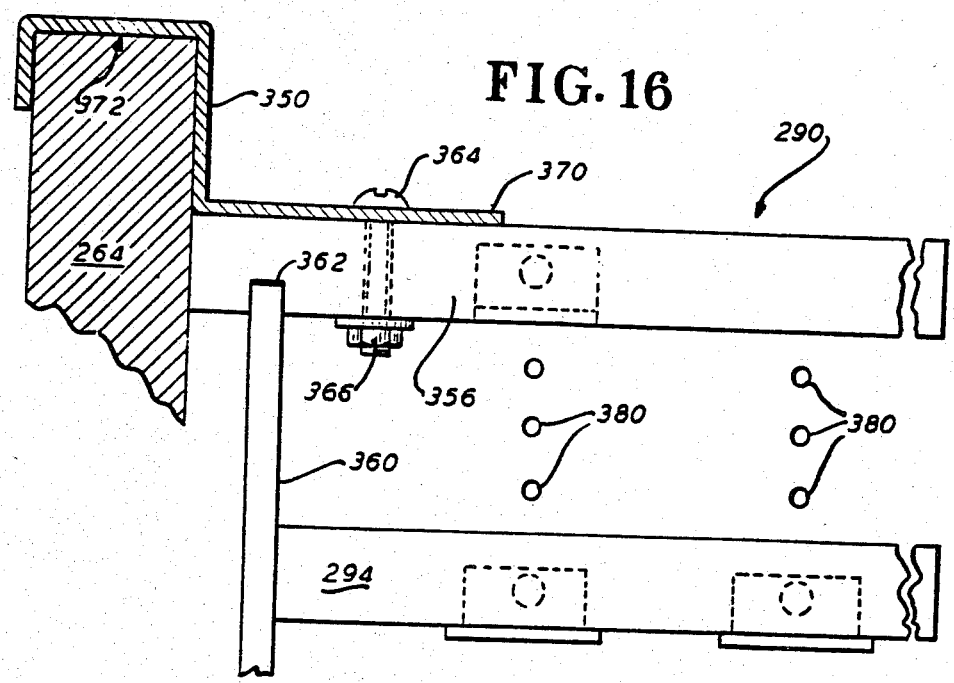
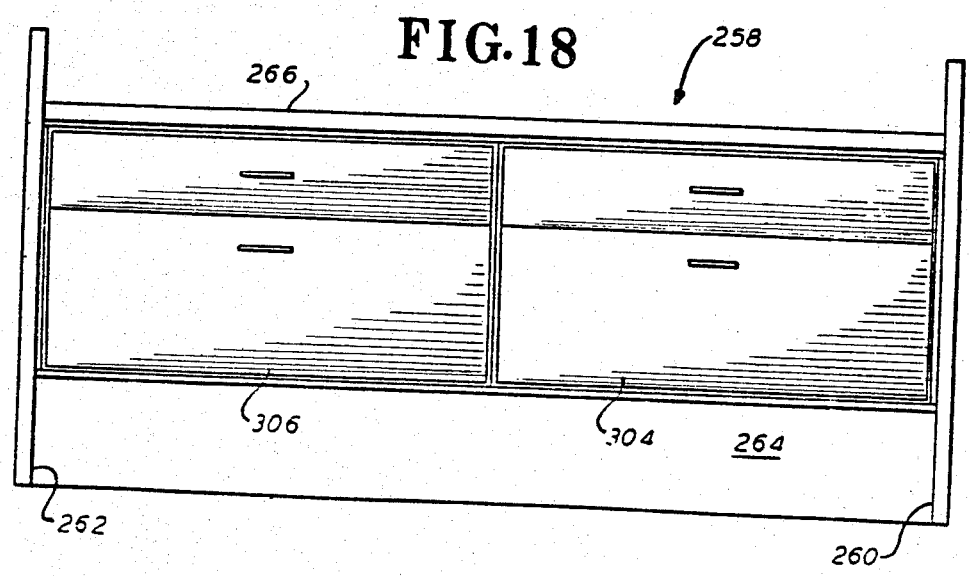

WORK STATIONS OF KNOCK-DOWN MODULAR COMPONENTS

This is a continuation of application Ser. No. 049,721 filed June 18, 1979, which is a continuation of application Ser. No. 885,351 filed Mar. 13, 1978.

BACKGROUND OF THE INVENTION—FIELD OF APPLICATION

This invention relates to work stations: and more particularly to work stations in the form of desks; desks combined with run-offs, run-offs and returns, or top units.

BACKGROUND OF THE INVENTION—DESCRIPTION OF THE PRIOR ART

There is considerable choice available in todays office furniture market. Not only in chairs and file cabinets; but in the office unit at which the user performs his job—the work station itself. The work station may have many configurations. It may be merely a desk; or it may be a desk and run-off (i.e. a unit extending at right angles to the desk at one side thereof); a desk, run-off and return (i.e. a unit extending at right angles to the run-off at one side thereof so as to be parallel to the desk); or a desk with top unit stacked on top of the desk. No matter what, the dealer is faced with the problem of offering to the public not only a wide variety of styles but also a wide selection of configurations within each style.

Displaying the various styles and some of the configurations presents somewhat of a space problem but can be solved by the use of good catalogues. It is not necessary to show the potential buyer each configuration of each style. It is, however, necessary to be able to provide the potential buyer with rapid availability of the style and configurations required to furnish the office. With the great number of dealers and suppliers in the marketplace the average purchaser knows that they are in a good bargaining position and therefore usually insists upon substantially immediate delivery. If not they take their business elsewhere.

The dealer who can stock the widest variety of work station styles and configurations may then have an advantage; and the supplier who assists in that endeavor can anticipate a better market penetration. Work stations: whether they be merely desks (such as shown in U.S. Pat. No. Des. 235,721 issued on July 8, 1975 to Douglas C. Ball for Desk or Similar Article or such as shown in U.S. Pat. No. Des. 240,184 issued on June 8, 1976 to Richard L. Neuschaefer for Desk) or desks and run-offs (such as shown in U.S. Pat. No. 3,920,298 issued on Nov. 18, 1975 for Convertible Desk and Secretarial Unit and U.S. Pat. No. 3,079,207 issued on Feb. 26, 1963 to C. U. Deaton for Bi-Level Desk) or Stacked units (such as shown in U.S. Pat. No. Des. 233,970 issued on Dec. 24, 1974 to Ronald R. Hodges for Storage Unit and U.S. Pat. No. Des. 239,009 issued on July 9, 1974 to Fred A. Schmitt for Combined Desk and Storage Unit) are very bulky. Stocking a large variety of configurations thus presents a great problem. Either the dealer must have considerable and costly warehousing space or he may have to forgo a possible sale.

One approach to the storage problem has been to provide office furniture constructed from modular components. However, modular constructions such as that shown in U.S. Pat. No. 3,857,622 issued on Dec. 31, 1974 to Robert G. Mohr et al for End Panel Support System; and that shown in U.S. Pat. No. 3,663,079 issued on May 16, 1972 to Oswaldo Borsani for Modular Elements For Pieces of Furniture and Pieces of Furniture Obtained Thereby are so complex in construction that, at best, they only provide an advantage to the manufacturer and not the dealer who sells to the end user.

A further approach has been to provide office furniture which is knock-down (k-d). That is the unit is marketed in an unassembled condition with final assembly by either the dealer or the end user. The knock-down unit is more compact in storage allowing for storage of more than one unit in the space that a conventional and fully assembled unit would occupy. However, knock-down units such as that shown in U.S. Pat. No. 3,971,608 issued on July 27, 1976 to Charles C. Gans for Knock-Down Drawer Unit is not modular; and because it makes no provision for run-offs, returns, or stackable units does not provide the number of configurations required by todays office furniture market. The k-d construction shown in U.S. Pat. No. 3,838,902 issued on Oct. 1, 1974 to Giorgio Tenani for Easily Assemblable Furniture Such as a Desk only show a desk unit and thus also does not provide the degree of configurations required by todays marketplace. Such constructions, furthermore, do not provide the extent of modularity from which a large number of work station configurations may be provided from a relatively small number of basic components. The type of units shown in U.S. Pat. No. Des. 235,719 issued to Douglas C. Ball on July 8, 1975 for Desk or Similar Article; and U.S. Pat. No. Des. 240,785 issued to Fuller Robinson on Aug. 3, 1976 for Desk while attempting to provide some degree of modularity do not provide sufficient modularity for a number of work station configurations and do not provide same in a knock-down type of construction.

SUMMARY OF THE INVENTION

It is therefore an object of this invention to provide new and improved work stations.

It is another object of this invention to provide new and improved modular components from which a work station can be constructed.

It is still another object of this invention to provide new and improved modular components from which a plurality of different work station configurations can be constructed.

It is yet another object of this invention to provide new and improved modular components for assembling a comparatively large number of different work station configurations from a relatively few different configurations of modular components.

It is yet still another object of this invention to provide new and improved modular components for assembling a basic work station in the form of a desk and wherein additional and similar and/or identical components can be added to the basic desk work station to provide other configurations of work stations in the form of desk and run-offs or desks, run-offs and returns.

It is yet still a further object of this invention to provide new and improved modular components for assembling into various work station units of different configurations, and also from which top units stackable upon said work station units can be formed to assemble still other work station configurations.

It is yet still another object of this invention to provide new and improved modular components for work stations and which are fabricated to be distributed in knock-down condition and assembled in the field with relative ease.

It is yet still a further object of this invention to provide new and improved modular components for assembly into a basic work station unit and to assemble to said work station unit drawers and cabinets accessable from the rear side of said unit as well as from the front side of said unit. This invention involves work stations; and contemplates assembling a plurality of work station configurations from a relatively small number of basic modular components fabricated for shipment in knock-down condition and assembly in the field with relative ease. It further contemplates forming the vertical support for the basic desk unit from a pair of identical side panels assembled in spaced relationship and interconnected directly to a cross panel; with the desk work surface disposed between said side panels and atop said cross panel and connected directly thereto. From this basic unit one can assemble other work station unit configurations by adding additional and identical side panels of either full or half width, and additional work surfaces. Drawers, and open, shelved or door or drawer cabinets can then be disposed below the work surface and between the side panels to provide storage space for the work station.

Other objects, features, and advantage of the invention in its details of construction and arrangement of parts will be seen from the above, from the following description of the preferred embodiments when considered with the drawings and from the appended claims.

BRIEF DESCRIPTION OF THE DRAWINGS

FIG. 4 is a front perspective view of a work station with a desk unit and run-off;

FIG. 8 is a partial elevational view showing details of the interconnection of the run-off work surface of FIG. 7 to the return vertical support panel and work surface;

FIG. 9 is a front perspective view of a work station with a desk unit, run-off, and return and with drawers and a drawer cabinet assembled to the desk unit for access from the rear of the desk;

FIG. 10 is a front perspective view of the work station of FIG. 9 showing a cabinet assembled to the return unit, and a pair of side by side cabinets assembled to the desk unit for access from the front of the desk;

FIG. 11 is an elevational schematic showing back to back cabinets assembled to the desk unit;

FIG. 12 is an elevational schematic showing of a work station unit with a pair of open cabinets assembled thereto and sized to provide a spaced relationship between the cabinets;

FIG. 13 is an elevational schematic showing of a work station unit showing a pair of open cabinets assembled thereto and sized to fill the space between the side panels;

FIG. 14 is an elevational schematic showing of a work station unit with a pair of open but shelved cabinets of modified configuration assembled thereto by the use of brackets which suspend the cabinets from the cross panel thereof;

FIG. 15 is a partial front elevational view of one cabinet from FIG. 14 showing details in the assembly thereof;

FIG. 16 is a partial side elevational view of the cabinet of FIG. 15;

FIG. 17 is an elevational schematic showing of a work station unit with a pair of drawer cabinets assembled thereto;

FIG. 18 is an elevational schematic showing of a work station unit with a modified pair of drawer cabinets assembled thereto;

DESCRIPTION OF THE PREFERRED EMBODIMENTS

For convenience the invention will be described as applied to work stations of various configurations but all fabricated from substantially undecorated, either square or round cornered, wood panels; it being understood, nevertheless, that without departing from the scope of the invention that the basic unit need not be the desk unit; that the panels may be of other material and that they may be decorated and of other suitable configuration.

Figure 1:
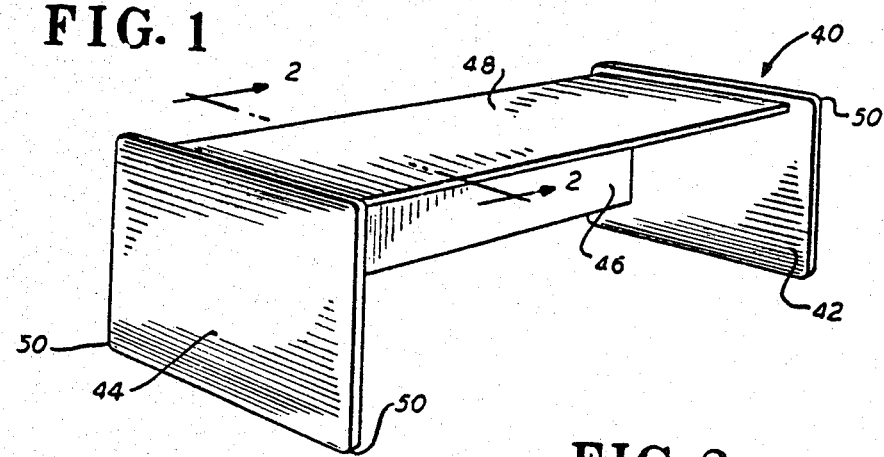
FIG. 1 is a front perspective view of a basic work station in the form of a desk unit incorporating the instant invention.
Figure 2:
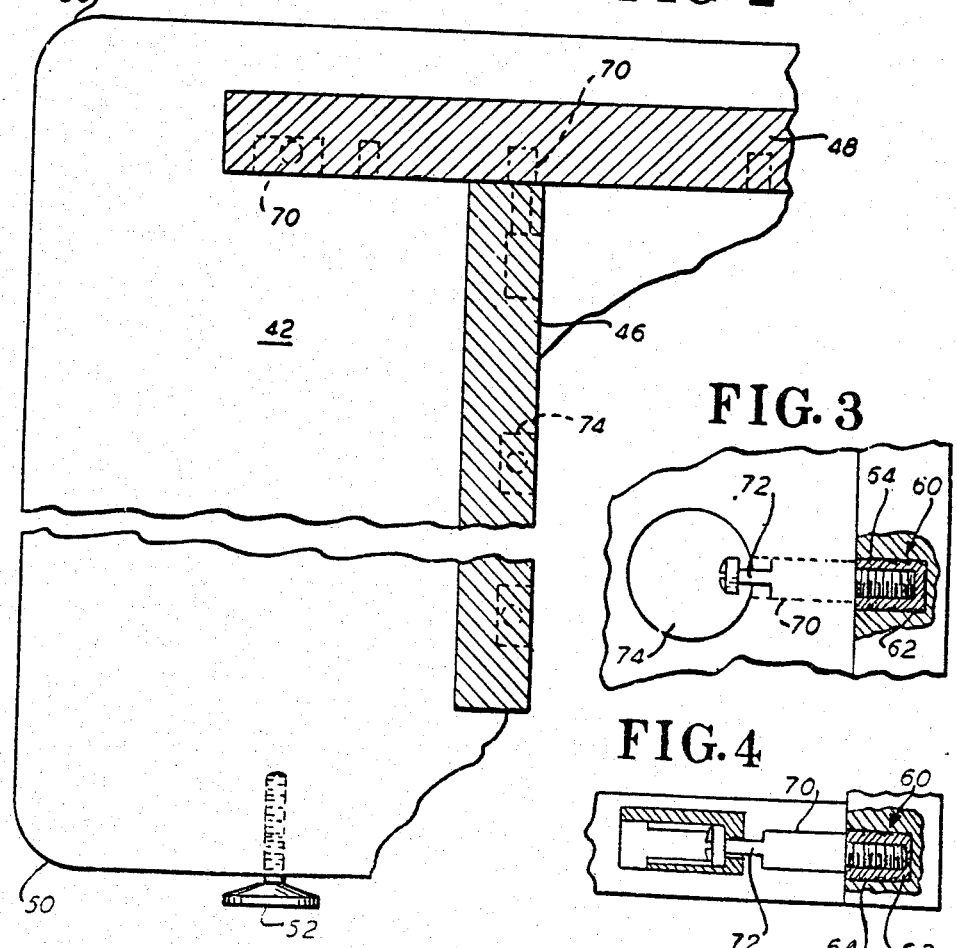
FIG. 2 is a partial sectional view, taken on line 2—2 of FIG. 1.

With reference to FIG. 1, there is generally shown at 40 a work station in the form of a basic desk unit assembled from a pair of identical side panels 42 (FIGS. 1 and 2) and 44 (FIG. 1) disposed in vertical and spaced alignment and directly secured to a cross panel 46 as will be hereinafter described. A work surface or desk top 48 is disposed between side panels 42, 44 and on top of cross panel 46. Side panels 42, 44 may have their corners 50 rounded for aesthetic appearances and may be provided with levelers 52 (FIG. 2) if desired.

Figure 3:
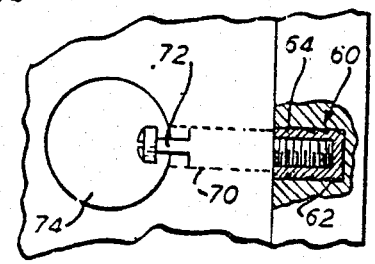
FIG. 3 is a partial plan view showing details of a connecting assembly for securing the panel members together.
Figure 4:
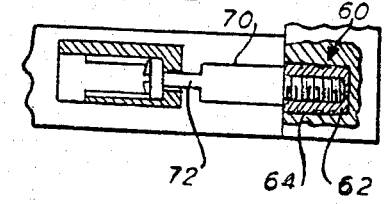
FIG. 4 is a partial sectional view showing further details of the connecting assembly of FIG. 3.

Side panels 42, 44 are formed from suitable wood, or other material, and are provided at appropriate locations with holes 60 (FIGS. 3 and 4) drilled partially down from one surface thereof. Into these holes an apertured attachment plug is inserted. Each plug 62 has saw tooth like barbs 64 formed on the outside surface thereof; with the outer diameter of the barbs slightly larger then the internal diameter of the holes 60. As such when a plug 62 is inserted into hole 60 with the use of a little force barbs 64 will lodge into the wood surrounding hole 60 and plug 62 will be firmly in place.

Cross panel 46 and work surface 48 are, in turn, provided with drilled apertures 70 sized to accept the threaded shank of a bolt 72 and with access openings 74 suitably sized and drilled into the panels so as to communicate with apertures 70.

Holes 60, apertures 70 and access openings 74 are predrilled at the manufacturing plant so as to accommodate the intended end use of the panels and work surfaces; and so as to minimize the number of different panels needed to be stocked. Plugs 62 and bolts 72 are provided with the panels and work surfaces in knockdown condition. The user or dealer may then assemble the work station in the field by inserting plugs 62 in appropriate holes 60 and bolting the parts together directly to each other with bolts 72. As such there is no need for support frames or other members which only require additional expense to fabricate, and store and overly complicate the assembly of the components into a work station.

Figure 5:
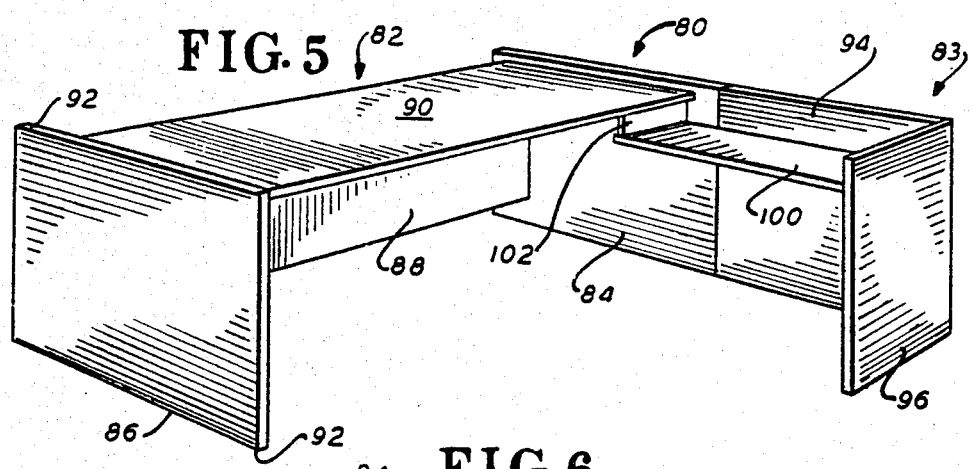

In FIG. 5, there is shown a work station 80 with a basic desk unit 82 and a run-off 83. Desk unit 82 is assembled from a pair of side panels 84, 86, a cross panel 88 and a work surface 90 all assembled as described for work station 40 of FIGS. 1 and 2. Panels 84, 86 are here shown with square corners 92.

An additional side panel 94 is disposed in line with side panel 84 and a half width side panel 96 is attached at right angles at the end of side panel 94. Side panels 94 and 96 (FIGS. 5 and 6) serve as vertical supports for a run-off work surface 100 which is secured at one of its ends to panel 96, along its back edge to side panels 94 and 84 and at its other end to a short panel 102 which is in turn secured to the under surface of work surface 90.

Figure 6:
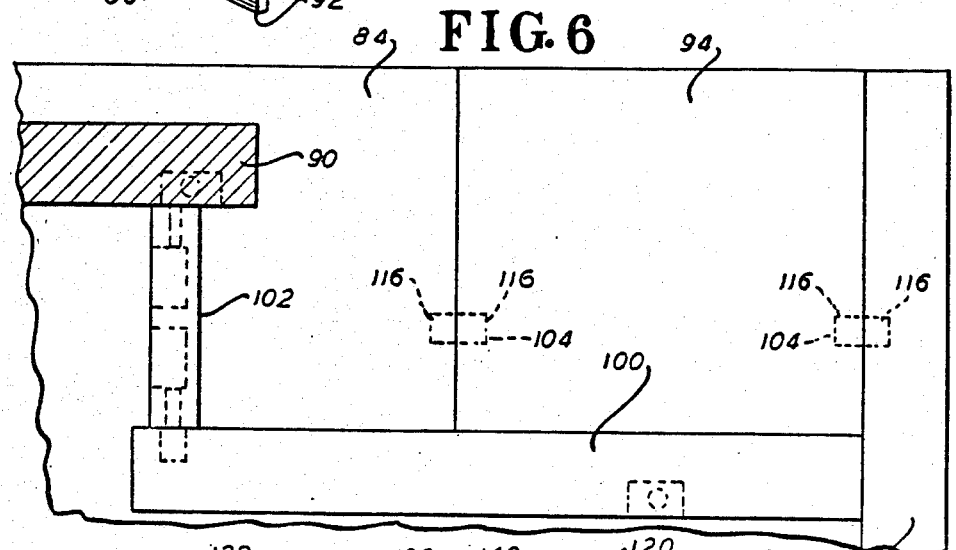
FIG. 6 is a partial elevational view showing details of the interconnection of the run-off work surface of FIG. 5 to its vertical support panel and the basic desk unit.
Figure 6A:
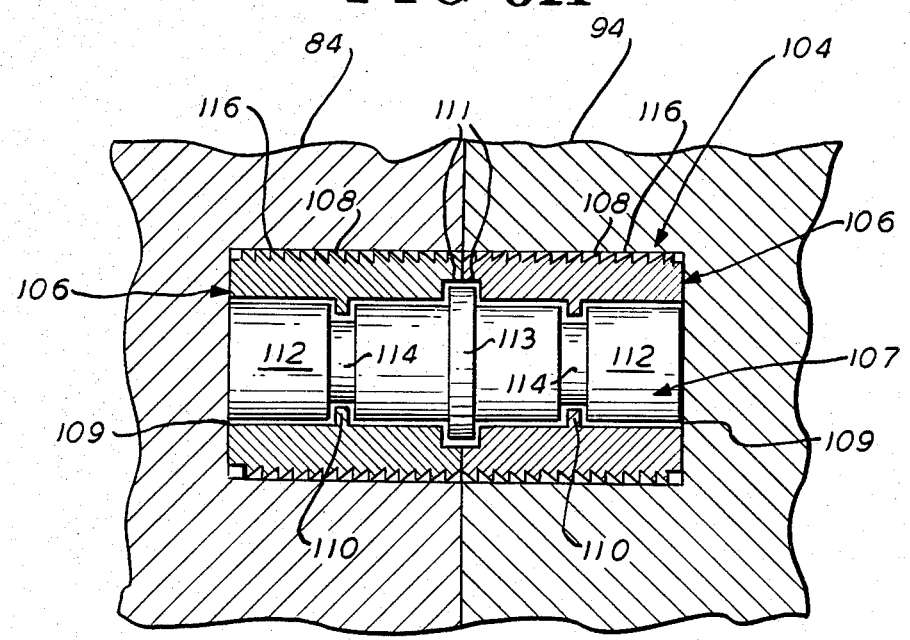
FIG. 6A is an enlarged sectional showing of a hidden type connector assembly utilized to connect two panel members in side to side relationship.
Figure 6B:
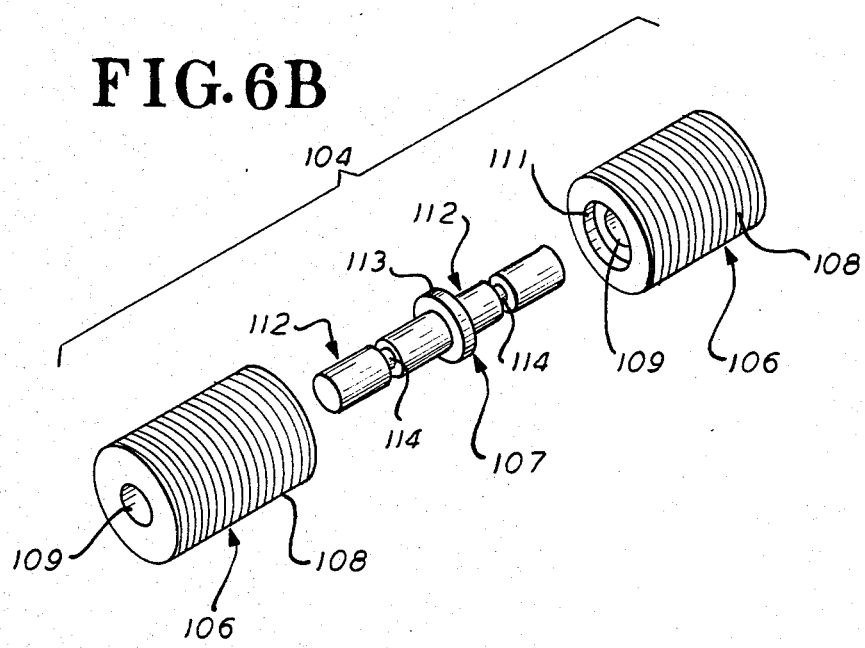
FIG. 6B is a perspective showing of the hidden type connector assembly of FIG. 6A.

Attachment of side panels 84 and 94, in the side to side relationship shown; and of panel 96 at right-angles with panel 94 is accomplished by a hidden type connector assembly 104 (FIGS. 6, 6A and 6B). A hidden connector assembly is utilized because to use threaded members such as bolts 72 and plugs 62 (FIGS. 3 and 4) requires forming unsightly openings 74 in places where a smooth unblemished surface is required.

Each connector assembly 104 includes a pair of plugs 106 and a connector 107. Plugs 106 are each formed of suitable plastic; and with a plurality of ribs 108, of saw tooth configuration. A central bore 109 extends through each plug 106; and a rib 110 (FIG. 6A) extends inwardly at about the midpoint of bore 109. A recess 111 is formed in the face of each plug 106. Connector 107 is also formed from suitable plastic and includes a pair of opposed stub shafts 112 each disposed to one side of a central raised rib 113; and each including a groove 114 formed about mid-way on each shaft 112.

In utilizing connector assembly 104 one merely needs to drill aligned holes 116 in side panels 84 and 94; and 94 and 96. Each hole 116 should be sized to accept a plug 106 but so that once inserted ribs 108 thereof grab against the side walls of holes 116 to firmly anchor plugs 106 in place. One shaft 112 of connector 107 is then inserted in bore 109 of plug 106 until its groove 114 snaps over rib 110 within bore 109. At this point one side of central raised rib 113 of connector 107 is seated in recess 111 of plug 106. The other shaft 112 is then aligned with the other plug 106 and the two panel members are moved into a butting relationship; at which time rib 110 of the other plug 106 will snap into groove 114 of shaft 112.

Figure 7:
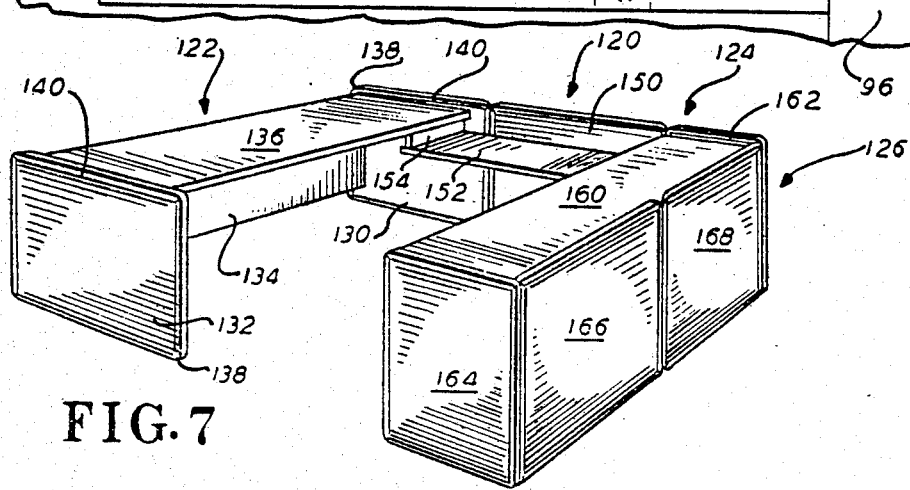
FIG. 7 is a front perspective view of a work station with a desk unit, run-off and return.

In FIG. 7, there is shown a work station 120 with a basic desk unit 122, a run-off 124, and a return 126 all interconnected to form work station 120. Desk unit 122 is assembled from a pair of side panels 130, 132, a cross panel 134 and a work surface 136 all assembled together as described for work station 40 of FIGS. 1 and 2. Panels 130, 132 are here shown with round corners 138 and with an edging detail 140.

An additional side panel 150, disposed in line with panel 130, serves as a back wall and as part of the vertical support for a run-off work surface 152. A short panel 154 connects one side of run-off work surface 152 to work surface 136 of desk unit 122 and a short panel 158 (FIG. 8) connects the other end of run-off work surface 152 to the underside of a return work surface 160 of return 126. Short panels 154, 158 run-off work surface 152, desk work surface 136, return work surface 160 and side panels 130 and 150 are all interconnected by either bolts and plugs, such as bolts 72 and plugs 62 (of FIGS. 3 and 4) or by hidden type connectors such as 104 (of FIGS. 6A and 6B) as described for the previous embodiments. In like manner a pair of full width side panels 166, 168 to form the vertical supports for return work surfaces 160 of return 126.

The work station 180 of FIGS. 9, 10 and 11 includes: a desk unit 182 assembled from a pair of side panels 184 and 186, a cross panel 188 and a work surface 190; a run-off 192 assembled from a side panel 194, a work surface 196, and a pair of short panels 198 (only one shown); and a return 200 assembled from a pair of side panels 202, 204 which function as end panels and a pair of side panels 206, 208 which form a back wall, all so as to form the vertical support for a return work surface 210. Side panels (184, 186, 194, 202, 204, 206, and 208), work surfaces (190, 196 and 210) and cross panel are all fabricated and shipped in knock-down condition and assembled and secured together as described for the hereinabove embodiments.

It should be noted that return 200 utilizes full-width side panels 202, 204 as end panels rather than half-width panels as shown for that purpose in the embodiment of FIGS. 7 and 8. This provides for more space within work station 180 and for a longer work surface 196 for the run-off.

A pair of pencil drawers 230, 232 are assembled to desk unit 182 between short panel 198 and a cabinet unit 234 in the form of a pedestal. Drawers 230 and 232 and cabinet 234 are assembled to the rear of desk unit 182 as will be hereinafter described. By the rear of desk unit 182 is meant that side of desk unit 182 where the user normally positions themselves while doing their work. An additional cabinet unit 236 (FIG. 10) is assembled to return 200; while a pair of cabinet units 238, 240 are assembled to the front of desk unit 182 (by the front is meant the side of the desk opposite to the one where the user normally positions themselves when doing their work). Cabinets 236, 238, and 240 are assembled and secured to their respective units as will be hereinafter described.

In FIGS. 12, 13, 14, 17 and 18, there are shown work station units 250, 252, 254, 256 and 258 respectively; all basically formed from a pair of side panels 260 and 262, a cross panel 264, and a top surface or panel 266 (except for work station unit 254 of FIG. 14); and all assembled and interconnected as hereinabove described. Work stations 250, 252, 254, 256 and 258 may function as desk units, run-off units, return units, credenza type stand alone units or top units which are stacked upon a desk unit or themselves to form a high work station as will be hereinafter described.

A pair of open cabinets 280, 282 are assembled to work station unit 250 beneath top surface 266 thereof, adjacent side panels 260, 262 respectively, but in spaced relationship with each other. Work station unit 252 includes a pair of open cabinets 284, 286 which completely fill the space between side panels 260, 262; while in work station 254 cabinet units 288, 290 not only fill the space between side panels 260, 262 but they are taller and are fitted for shelves 292, 294. A pair of cabinets 300, 302 (FIG. 17) spaced from each and fitted for drawers are shown for work station 256; while a pair of cabinets 304, 306 also fitted for drawers occupy the full width of work station unit 258.

Cabinets 288, 290 are suspended by brackets 350 (FIGS. 14, 15 and 16) from cross panel 264 of work station unit 254. Each cabinet 288, 290 (only one shown in FIGS. 15 and 16) is assembled from a pair of spaced side walls 352, 354 (FIG. 15) a top wall 356, a bottom wall 358 and a rear wall 360. Side walls 352, 354, bottom wall 358 and rear wall 360 are secured to each other by bolts 72 and plugs 62 as hereinbefore described and so that they may be shipped knock-down and assembled on site. Rear wall 360 is fitted into grooves 362 (FIG. 16) formed in top wall 356, bottom wall 358, and side walls 354, 352. Brackets 350 are attached by means of bolts 364 and nuts 366 which extend through appropriately formed apertures in top wall 356 and in an attaching leg 370 formed on each bracket 350. A hook portion 372 is formed on each bracket 350 and sized so as to fit over the upper edge of cross panel 264.

Side walls 352, 354 of cabinets 288, 290 are each provided, on their surface facing into the cabinet, with aligned and spaced holes 380 sized to receive mounting lugs 384 for supporting shelves 292, 294 in conventional manner and so as to be adjustable at various levels within cabinets 288, 290.

Figure 19:
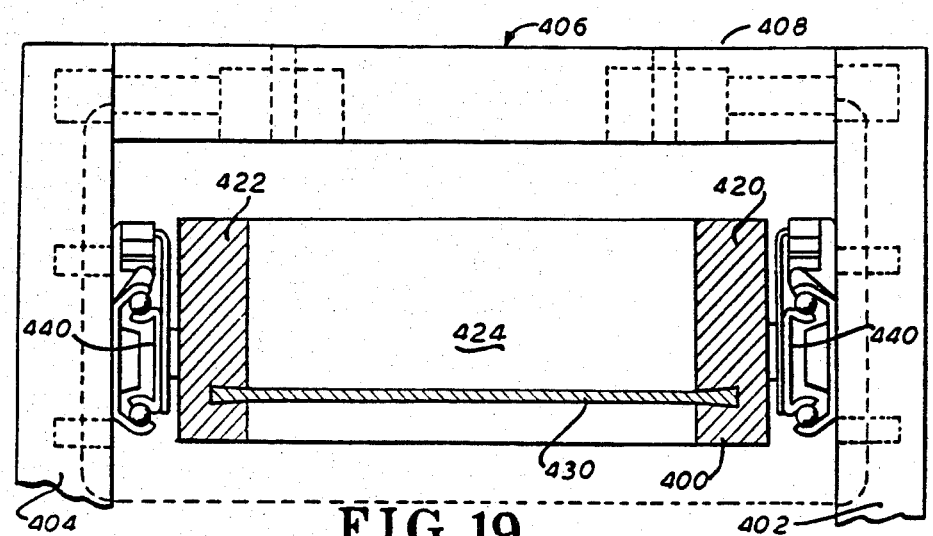
FIG. 19 is a partial vertical sectional view of a drawer assembled to a cabinet and showing the suspension therefore.
Figure 20:
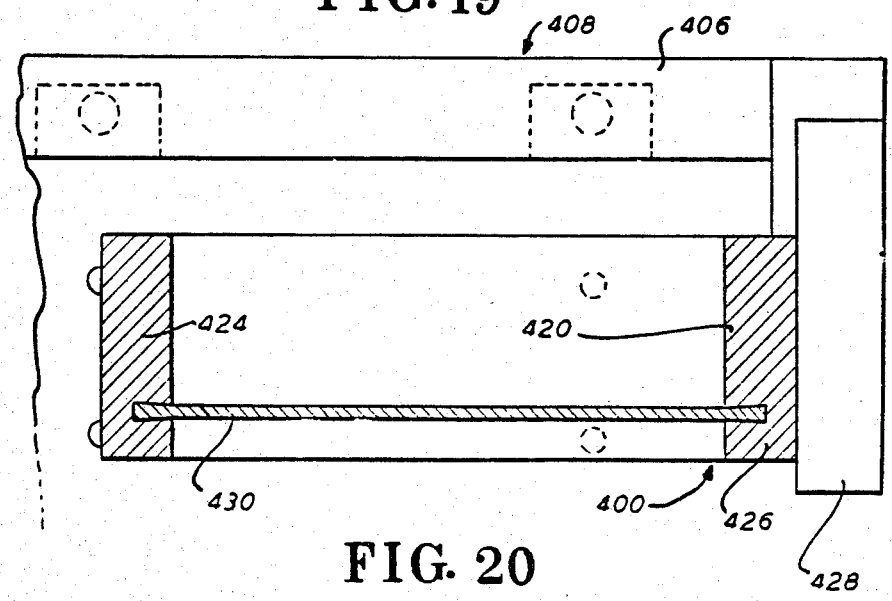
FIG. 20 is a partial vertical sectional view of the drawer of FIG. 19.
Figure 21:
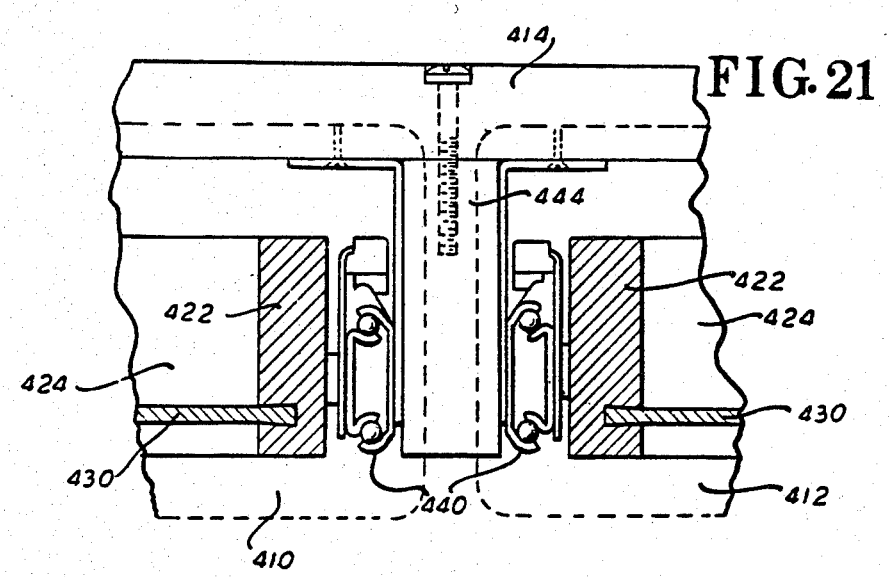
FIG. 21 is a partial sectional showing of a pair of adjacent drawers.

Pencil drawers 230, 232 (FIG. 9) and the drawers within cabinets 300, 302 (FIG. 17) and 304, 306 (FIG. 18) are secured within their respective cabinets in a conventional manner as shown in FIGS. 19, 20 and 21. A single pencil drawer 400 is depicted in FIGS. 19 and 20 mounted between side walls 402, 404 and below top wall 406 of a cabinet 408 of the type and construction previously described. In FIG. 21 a pair of adjacent pencil drawers 410, 412 (similar to pencil drawers 230, 232 of FIG. 9) are shown mounted directly beneath a work surface 414. It should be understood that the drawer construction and mounting is the same for all drawer units; the size and configuration being subject to change depending upon the drawer use. Each drawer 400, 410, 412 includes a pair of side walls 420, 422, a rear wall 424 and a front wall 426 (FIG. 20) to which a drawer front 428 is secured. A bottom panel 430 is lodged in grooves formed in the inner surfaces of side walls 420, 422, rear wall 424 and front wall 426. A drawer slide assembly 440 is appropriately connected to the outside wall of each side wall 420, 422 respectively and in the configuration of FIGS. 19 and 20 to the inner side of side walls 402, 404 of cabinet 408. For adjacent drawers, such as 410 and 412 of FIG. 21, a short center rib 444 is secured to the underside of work surface 414 and the adjacent slide assembly 440 is secured thereto.

Figure 22:
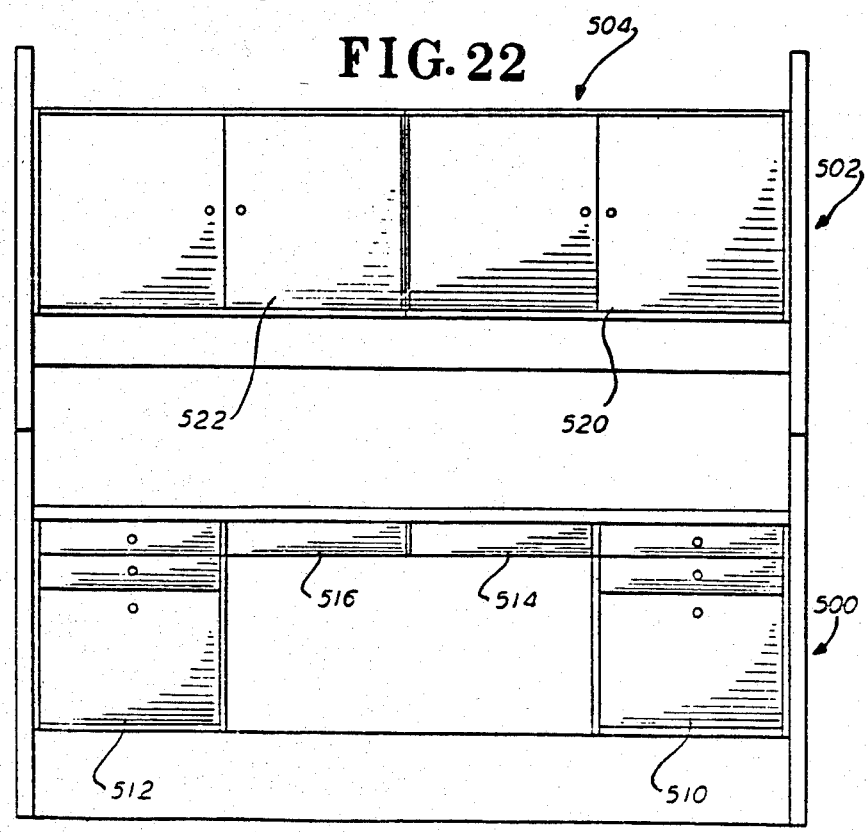
FIG. 22 is a front elevational schematic showing of a work station with a basic desk unit upon which a top unit is stacked.
Figure 23:
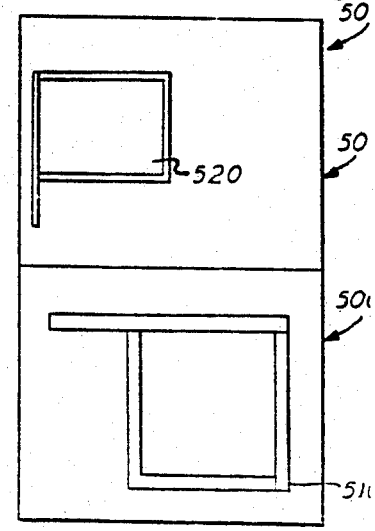
FIG. 23 is a side elevational schematic of the work station of FIG. 22.

In FIGS. 22 and 23 a pair of work station units 500, 502 are shown stacked one upon the other to form a high work station 504. Units 500 and 502 are similar in construction to units 250, 258 with unit 500 assembled with a pair of drawer cabinets 510, 512 spaced to each side of a pair of pencil drawers 514, 516 to form unit 500 as a knee hole type desk unit. Unit 502 includes a pair of door cabinets 520, 522 assembled together and secured in place as hereinbefore described. The schematic of FIG. 23 shows the relationship of cabinets 510 and 520.

Figure 24:
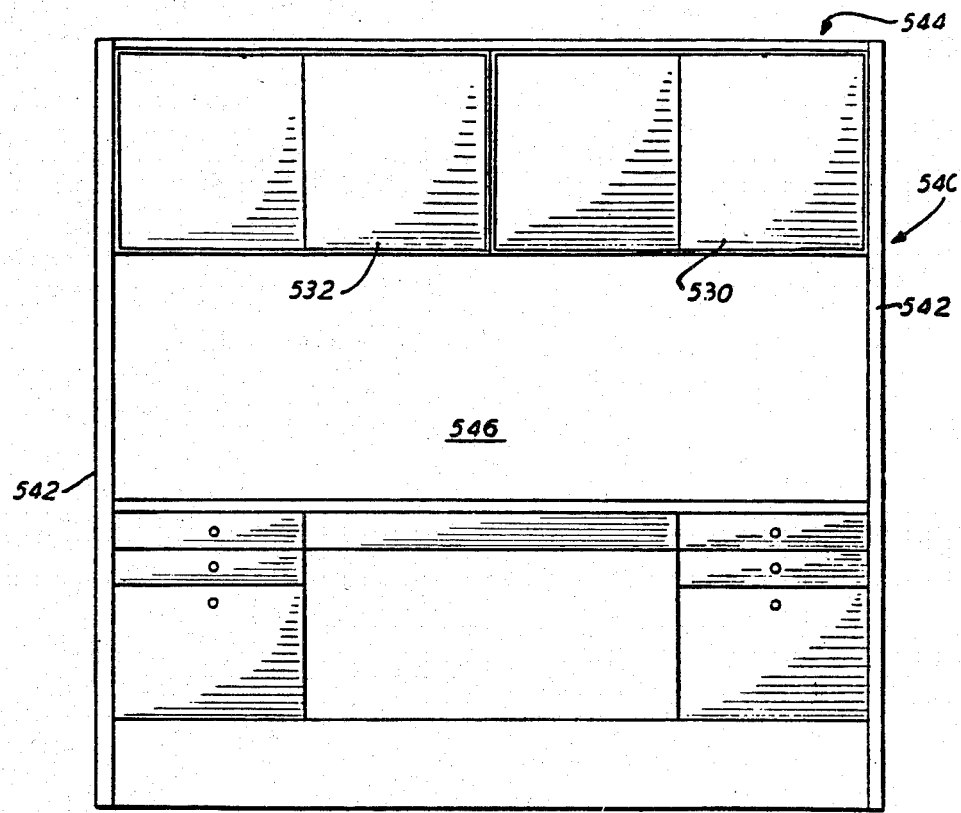
FIG. 24 is a front elevational schematic showing of a modified work station with a basic desk unit upon which a top unit is stacked.
Figure 25:
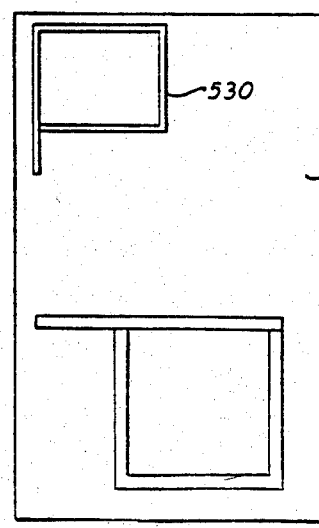
FIG. 25 is a side elevational schematic of the work station of FIG. 24.

Cabinets 520, 522 of FIGS. 22 and 23 are dropped down from the upper extremity of unit 502. On the other hand, they can be raised up as shown for cabinets 530, 532 of unit 540 of FIGS. 24 and 25 if more headroom is desired as shown for work station 544. In work station 544 each side panel 542 runs the full height of the unit. If desired a single back panel 546 can be utilized or the space merely left open.

Figure 26:
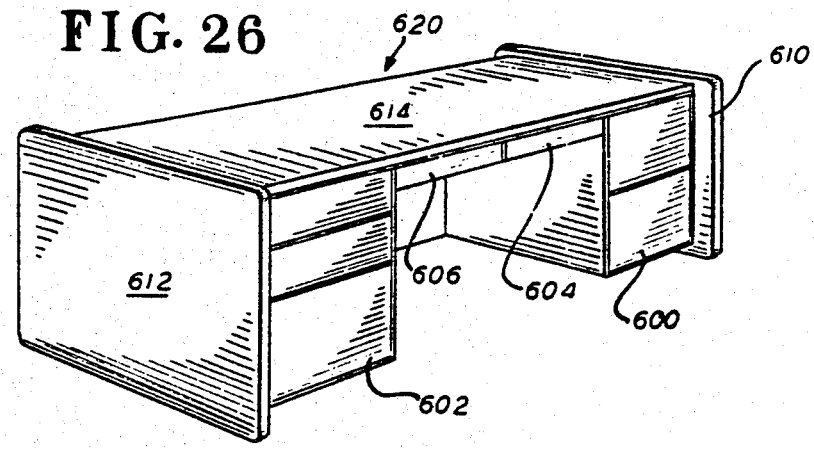
FIG. 26 is a front perspective view of a work station in the form of a desk unit with a pair of spaced pedestal cabinets and a pair of pencil drawers.
Figure 27:
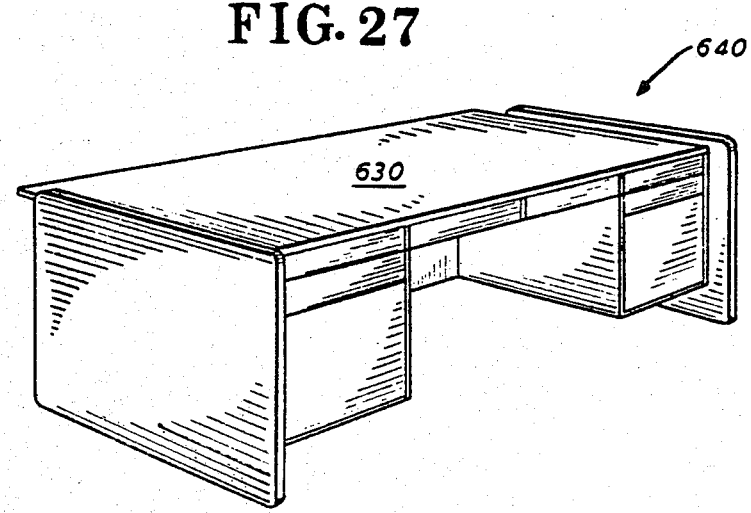
FIG. 27 is a modified arrangement of the work station of FIG. 26.

The basic desk unit may be formed with its drawer cabinets 600 (FIG. 26) and 602 and with its pencil drawers 604, 606 disposed between side panels 610, 612 and beneath a work surface 614 centered front to back between side panels 610, 612 as shown for desk unit 620. In the alternative a work surface 630 (FIG. 27) or deeper extent can be used to provide a conference type desk 640.

From the above description it will thus be seen that there has been provided a novel and improved modular work station construction where a minimum number of modular components provide a relatively large number of work station configurations; and wherein such modular components are fabricated for knock-down shipment and relatively simple on site assembly.

It is understood that although I have shown the preferred form of my invention that various modifications may be made in the details thereof without departing from the spirit as comprehended from the following claims.

I claim:
1. A working station comprising:
 a. a work surface having a pair of opposed side edges and front edges;
 b. a plurality of modular panels;
 c. securing means for attaching said work surface and said modular panels;
  wherein a first mode comprising a first pair of said modular panels are vertically disposed and attached to each of said side edges by said securing means, so as to support said work surface on the ground, and having a cross panel attached by said securing means to and vertically disposed between said first pair of modular panels,
  wherein a second mode, said work surface front edge, has attached a pair of modular panels which are vertically disposed, abutting each other and standing on the ground for support of said work surface; and wherein
 d. said work surface and said modular panels being fabricated for shipment in knock down condition and for on site assembly by said securing means, whereby said work surface and said modular panels may be assembled in said first mode and said sec- ond mode to provide different assemblies with said modular panels; and wherein e. at least one storage area is secured beneath said work surface, adjacent at least one of said side panels and accessible from one side of said cross panel; said one storage area being a desk pedestal type cabinet; and wherein f. at least one storage area is secured beneath said work surface, adjacent at least one of said panels and accessible from the other side of said cross panel; said one other storage area being a cabinet; and wherein said work station includes g. an additional work surface;

h. a pair of additional side panels; and i. additional securing means for attaching said additional side panels to each other and one of said side panels to form a vertical support for said additional work surface, and for attaching said additional work surface thereto so as to form a run-off said work surface; and wherein said work station includes j. a further work surface;

k. further side panels; and l. further securing means for attaching said further side panels to each other and to one of said additional side panels to form a vertical support for said further work surface, and for attaching said further work surface thereto so as to form a return for said additional work surface.

2. The work station of claim 1, wherein each panel of said plurality of modular panels is provided with a series of holes proximate one edge for cooperating with said securing means when said panel is attached to said work surface for said first mode, said panel being provided with another series of holes at opposed edges transversely disposed to said first holes and being further provided with a means for securing said panels to abut each other for said second mode.

3. The work station of claim 1, including a top unit formed from a pair of top unit side panels secured at one end of said side panels to a top cross panel and sized to sit atop said side panels to form therewith a high work station.

4. The work station of claim 1, wherein at least one of said additional side panels is identical in size and configuration with said side panels and, wherein at least one other additional side panel is smaller in one direction than the comparable dimension of said side panels.

5. The work station of claim 4, wherein said smaller dimension is one-half of the comparable dimension.

* * * * *